United States Patent
Fry et al.

(10) Patent No.: US 11,481,714 B2
(45) Date of Patent: Oct. 25, 2022

(54) AUTONOMOUS WIRELESS MOBILE ASSET MONITORING SYSTEM

(71) Applicant: Skywave Mobile Communications Inc., Ottawa (CA)

(72) Inventors: Robert James Fry, Ottawa (CA); Philippe Jonathan Gabriel Lafleur, Ottawa (CA)

(73) Assignee: SKYWAVE MOBILE COMMUNICATIONS INC.

( * ) Notice: Subject to any disclaimer, the term of this patent is extended or adjusted under 35 U.S.C. 154(b) by 1344 days.

(21) Appl. No.: 15/848,581

(22) Filed: Dec. 20, 2017

(65) Prior Publication Data

US 2018/0374038 A1    Dec. 27, 2018

Related U.S. Application Data

(60) Provisional application No. 62/440,126, filed on Dec. 29, 2016.

(51) Int. Cl.
| | |
|---|---|
| *H04W 4/38* | (2018.01) |
| *G06Q 10/08* | (2012.01) |
| *G01S 15/10* | (2006.01) |
| *G01S 15/04* | (2006.01) |
| *G01S 7/529* | (2006.01) |
| *G01S 7/527* | (2006.01) |
| *G01S 15/88* | (2006.01) |
| *H01Q 21/06* | (2006.01) |

(Continued)

(52) U.S. Cl.
CPC .......... *G06Q 10/0833* (2013.01); *G01S 7/529* (2013.01); *G01S 7/5273* (2013.01); *G01S 15/04* (2013.01); *G01S 15/10* (2013.01); *G01S 15/88* (2013.01); *G06Q 10/087* (2013.01); *H01Q 21/064* (2013.01); *H04B 11/00* (2013.01); *H04W 52/0277* (2013.01); *H04W 4/38* (2018.02)

(58) Field of Classification Search
CPC . H04W 4/38; H04W 52/0277; H04W 52/028; G01S 15/04; G01S 15/06; G01S 15/10; G01S 15/74; G01S 15/88; G01S 7/5273; G01S 7/529; G06Q 10/0833; G06Q 10/087; Y02D 30/70; H01Q 21/064; H04B 11/00
See application file for complete search history.

(56) References Cited

U.S. PATENT DOCUMENTS

| | | | |
|---|---|---|---|
| 9,786,187 B1 * | 10/2017 | Bar-Zeev | G08G 5/0034 |
| 2003/0094546 A1 * | 5/2003 | Kellner | B61L 15/0027 |
| | | | 246/167 R |

(Continued)

*Primary Examiner* — Jean A Gelin
(74) *Attorney, Agent, or Firm* — Thomas | Horstemeyer, LLP

(57) ABSTRACT

Disclose are various approaches for optimizing operation of an autonomous wireless mobile asset monitoring system. The approaches involve detecting the presence of cargo in a mobile asset. First, if energy conservation is a requirement of the system, each zone of the mobile asset is scanned until cargo is detected in one of the zones. Then, the results of the scan are transmitted to backend infrastructure. Alternatively, if energy conservation is not a requirement of the system, every zone of the mobile asset is scanned and the results of the scan are transmitted to backend infrastructure.

19 Claims, 7 Drawing Sheets

(51) Int. Cl.
   *H04B 11/00*   (2006.01)
   *H04W 52/02*   (2009.01)

(56) References Cited

U.S. PATENT DOCUMENTS

| | | | | |
|---|---|---|---|---|
| 2007/0239321 | A1* | 10/2007 | McAden | G07C 5/008 |
| | | | | 701/1 |
| 2008/0015956 | A1* | 1/2008 | Regard | G01G 23/3728 |
| | | | | 705/28 |
| 2008/0068171 | A1* | 3/2008 | Ehrman | G06Q 10/08 |
| | | | | 340/572.1 |
| 2008/0154712 | A1* | 6/2008 | Wellman | B66F 9/07581 |
| | | | | 705/7.26 |
| 2009/0219393 | A1* | 9/2009 | Vian | G08G 5/0086 |
| | | | | 701/25 |
| 2010/0039247 | A1* | 2/2010 | Ziegler | G07C 5/08 |
| | | | | 340/436 |
| 2011/0116600 | A1* | 5/2011 | Morton | G01V 5/0016 |
| | | | | 378/86 |
| 2012/0123646 | A1* | 5/2012 | Mantini | B62D 61/12 |
| | | | | 73/488 |
| 2012/0258731 | A1* | 10/2012 | Smith | G06F 16/9537 |
| | | | | 455/456.1 |
| 2013/0012234 | A1* | 1/2013 | Tufty | H04W 4/029 |
| | | | | 455/456.6 |
| 2020/0364525 | A1* | 11/2020 | Mats | H04W 4/70 |

\* cited by examiner

AUTONOMOUS WIRELESS MOBILE ASSET MONITORING SYSTEM

CROSS-REFERENCE TO RELATED APPLICATIONS

This application claims priority to, and the benefit of, U.S. Provisional Patent Application No. 62/440,126, entitled "AUTONOMOUS WIRELESS MOBILE ASSET MONITORING SYSTEM" and filed on Dec. 29, 2016, which is incorporated by reference as if set forth herein in its entirety.

BACKGROUND OF THE INVENTION

In the transportation and logistics industry, wireless communication, positioning and sensing technology has been employed extensively in an effort to improve the utilization of mobile assets such as containers and trailers, as well as improving overall operational efficiency.

Global Navigation Satellite Systems (GNSS) positioning data is reported over terrestrial or satellite networks on demand, at regular intervals or in response to events triggered by on-asset sensors.

With expanding terrestrial and satellite network capacity, communication costs are decreasing enabling cost effective and power efficient transfers of more data, especially in areas with broadband terrestrial coverage.

The cost of mobile asset monitoring equipment continues to decrease, making deployments across large fleets with thousands of assets commonplace. In order to successfully deploy a mobile asset monitoring system cost-effectively across an entire fleet, installation time needs to be short and feasible even with a fully-loaded mobile asset. An installation time on the order of 10 minutes is a typical target. Furthermore, the installation must be robust and maintain the environmental integrity of the mobile asset. Lastly, the installation needs to be well protected from the potential impact associated with the handling of the mobile asset.

Additional data from on-asset sensors may be included in reports to allow remote monitoring of the state of the mobile asset and its contents. Of particular interest for logistics operations are cargo sensing and door sensing. Cargo sensing is particularly challenging and typically addressed with a multi-zone ultrasonic sensor. Reflections from structural elements of the mobile asset, noise sources and wide swings in temperature and humidity are typical challenges to be overcome. Most mitigation techniques involve additional sensing and processing all of which contribute to power consumption.

Conducted power is not universally available and reliable on mobile assets and short installation time requirements make the installation of cables undesirable, leading to a preference for self-powered systems. Power management is critical in a self-powered mobile asset monitoring system.

There is therefore a need for a mobile asset monitoring system that can be installed quickly, takes advantage of broadband terrestrial network access when available and manages available power to provide optimized asset monitoring under given conditions.

SUMMARY OF THE INVENTION

An objective of the mobile asset monitoring system is to provide actionable data to transportation and logistics fleet management systems and personnel.

Various embodiments of the present disclosure include a method of optimizing operation of an autonomous wireless mobile asset monitoring system which detects presence of cargo in a mobile asset which comprises at least one zone, the method comprising:

i. if energy conservation is a requirement of the system, scanning each zone until cargo is detected in one of the zones and transmitting data comprising results of the scanning to a backend infrastructure; or ii. if energy conservation is not a requirement of the system, scanning every zone and transmitting data comprising results of the scanning to a backend infrastructure.

In some instances, the autonomous wireless mobile asset monitoring system comprises at least one transceiver, and the scanning comprises emitting at least one acoustic signal from the at least one transceiver, wherein if energy conservation is a requirement of the system, the at least one transceiver emits one acoustic signal, and wherein if energy conservation is not a requirement of the system, the at least one transceiver emits multiple acoustic signals. In various instances, the autonomous wireless mobile asset monitoring system further comprises a processor, wherein the scanning further comprises:

a. the at least one transceiver receiving at least one return signal and transmitting the at least one return signal to the processor;

b. the processor applying at least one cargo detection algorithm to the at least one return signal to generate the data which indicate presence or absence of cargo.

In some embodiments, if energy conservation is a requirement of the autonomous wireless mobile asset monitoring system and if the data is transmitted over a narrowband satellite network, the data comprises only binary scanning results; otherwise the data comprises both binary and analog scanning results, and wherein if energy conservation is not a requirement of the autonomous wireless mobile asset monitoring system and if the data is transmitted over a broadband terrestrial network, then the at least one return signal is also transmitted with the data for further processing at the backend infrastructure. In some instances, an area of overlap exists between any two or more zones and the area of overlap is scanned by multiple transceivers as part of each encompassing zone resulting in improved detection reliability by covering dead zones introduced to eliminate structure-related returns.

Various embodiments of the present disclosure include an autonomous wireless mobile asset monitoring system for detecting presence or absence of cargo in a mobile asset, comprising:

a door sensor for detecting whether a door of the mobile asset is in a closed or open state;

a cargo sensor comprising at least one ultrasonic transceiver for emitting acoustic signals in the mobile asset and receiving return signals based on the transmitted acoustic signals;

a mobile asset monitoring device that processes analog and/or binary data representative of the return signals to determine, using at least one cargo detection algorithm, the presence or absence of cargo in the mobile asset;

a battery for powering the cargo sensor and the mobile asset monitoring device; and backend infrastructure for storing the analog and/or binary data and for storing the at least one cargo detection algorithm. Some embodiments include a mobile device that communicates with the door sensor and the cargo sensor, wherein the mobile device comprises a processor containing instructions that permit a user to perform a diagnostic operation of the autonomous wireless mobile asset monitoring system. In some embodiments, the cargo sensor comprises a wireless sensor hub antenna that permits wireless communication between the door sensor and the mobile asset monitoring device. In some instances, the cargo sensor comprises at least one low-profile acoustic horn antenna, wherein the at least one ultrasonic transducer is mounted within a corresponding low-profile acoustic horn antenna, and wherein the wireless sensor hub antenna is mounted in proximity to the at least one low-profile acoustic horn antenna such that when the autonomous wireless mobile asset monitoring system is mounted to the mobile asset, the wireless sensor hub antenna and the at least one low-profile acoustic horn antenna share access to a hole drilled into the mobile asset. In various embodiments, the backend infrastructure comprises a server, and wherein the server performs further processing of the analog and/or binary data. In some embodiments, the further processing comprises processing the analog and/or binary data at multiple gain levels. In some instances, the further processing comprises compensating for temperature and humidity. Some embodiments also include a solar panel to recharge the battery. In some embodiments, the door sensor and the cargo sensor each comprise environmental sensors which provide environmental readings of the interior of the mobile asset, wherein the cargo sensor comprises a compensation network which compensates for acoustic propagation losses in the acoustic signals based on the environmental readings.

Various embodiments of the present disclosure include a method of optimizing operation of an autonomous wireless mobile asset monitoring system which detects the presence of cargo in a mobile asset, the autonomous wireless mobile asset monitoring system comprising at least one ultrasonic transceiver for transmitting acoustic signals and receiving return signals based on the transmitted acoustic signals, the at least one ultrasonic transceiver being controlled by a processor, the method comprising:

determining whether energy conservation is required;
if energy conservation is required:
   i. the processor controlling the at least one ultrasonic transceiver to transmit an acoustic signal in a first zone closest to the at least one ultrasonic transceiver, and to receive a first return signal which is sent to the processor for processing using at least one cargo detection algorithm;
   ii. if the processor determines that cargo is absent based on the previous step, the processor controlling the at least one transceiver to transmit another acoustic signal in a second zone further removed from the at least one ultrasonic transceiver, and to receive a second return signal which is sent to the processor;
   iii. if the processor determines that cargo is absent based on the previous step, the processor controlling the at least one transceiver to transmit a subsequent acoustic signal in a corresponding subsequent zone even further removed from the at least one ultrasonic transceiver, and to receive a corresponding subsequent return signal which is sent to the processor, the processor controlling the at least one transceiver to continue to transmit subsequent acoustic signals in corresponding subsequent zones until either acoustic signals have been transmitted in all of the zones or the processor determines that cargo is present in one of the zones;
   iv. the processor transmitting:
      1. binary data representative of the processed return signal in the one of the zones in which cargo was present, or all the processed return signals to a backend infrastructure for storing and/or further processing using a narrowband satellite network; or
      2. binary and analog data representative of the processed return signal in the one of the zones in which cargo was present, or all the processed return signals to a backend infrastructure for storing and/or further processing using a broadband terrestrial network;
if energy conservation is not required and only a narrowband satellite network is available:
   i. the processor controlling the at least one ultrasonic transceiver to transmit multiple acoustic signals in a first zone closest to the at least one ultrasonic transceiver, and to receive multiple first return signals which are sent to the processor for processing using at least one cargo detection algorithm;
   ii. the processor controlling the at least one transceiver to transmit further multiple acoustic signals in a second zone further removed from the at least one ultrasonic transceiver, and to receive multiple second return signal which are sent to the processor;
   iii. the processor controlling the at least one transceiver to transmit subsequent multiple acoustic signals in a corresponding subsequent zone even further removed from the at least one ultrasonic transceiver, and to receive multiple corresponding subsequent return signals which are sent to the processor, the processor controlling the at least one transceiver to continue to transmit subsequent acoustic signals in corresponding subsequent zones until acoustic signals have been transmitted in all of the zones;
   iv. the processor transmitting binary and analog data representative of all the processed return signals to a backend infrastructure for storing and/or further processing; or
if energy conservation is not required and a broadband terrestrial network access is available:
   i. the processor controlling the at least one ultrasonic transceiver to transmit multiple acoustic signals in a first zone closest to the at least one ultrasonic transceiver, and to receive multiple first return signals which are sent to the processor for processing using at least one cargo detection algorithm;
   ii. the processor controlling the at least one transceiver to transmit further multiple acoustic signals in a second zone further removed from the at least one ultrasonic transceiver, and to receive multiple second return signal which are sent to the processor;
   iii. the processor controlling the at least one transceiver to transmit subsequent multiple acoustic signals in a corresponding subsequent zone even further removed from the at least one ultrasonic transceiver, and to receive multiple corresponding subsequent return signal which are sent to the processor, the processor controlling the at least one transceiver to continue to transmit subsequent acoustic signals in corresponding subsequent zones until acoustic signals have been transmitted in all of the zones;
   iv. the processor transmitting binary and analog data representative of all the processed return signals, as well as analog data representative of the unprocessed return signals to a backend infrastructure for storing and/or further processing.

In some of these embodiments, if energy conservation is not required and the broadband terrestrial network access is available, the method further comprising a step prior to (b") of communicating with the backend infrastructure to determine if there are any updates to the at least one cargo detection algorithm, and to download at least one of the updates. In some embodiments, if energy conservation is not required, the at least one ultrasonic transceiver transmits the multiple acoustic signals and receives the multiple return signals at multiple gain levels.

DETAILED DESCRIPTION OF THE INVENTION

A description of preferred embodiments of the invention follows.

Figure 1:
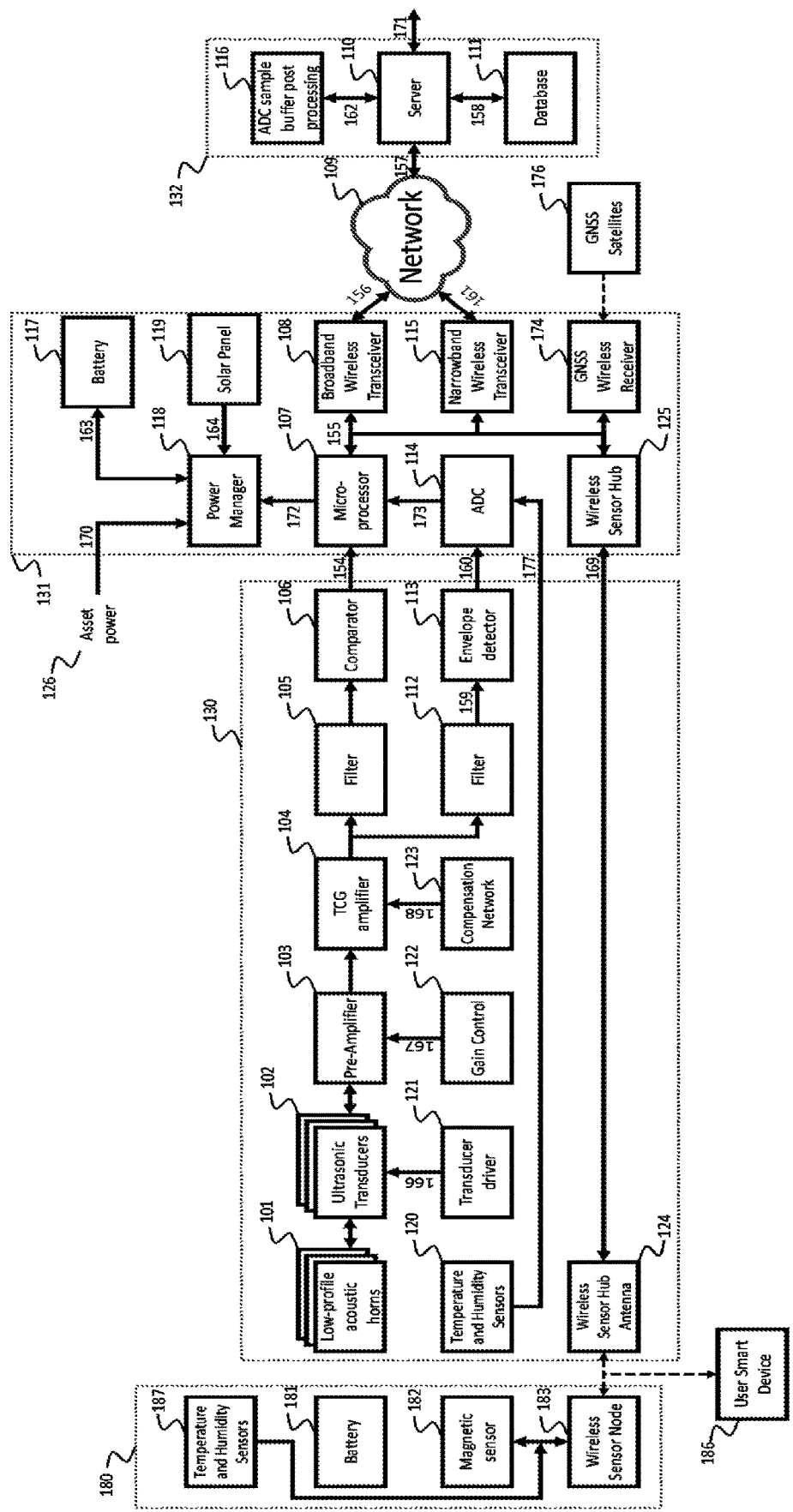
FIG. 1 is a block diagram of the principal components of the autonomous wireless mobile asset monitoring system.

FIG. 1 shows a block diagram of the autonomous wireless mobile asset monitoring system of the present invention. The autonomous wireless mobile asset monitoring system comprises door sensor 180, cargo sensor 130, mobile asset monitoring device 131, wireless communications network 109 and backend infrastructure 132.

Door sensor 180 detects whether the door of the mobile asset is in an open or closed state. The door sensor 180 is powered by battery 181. The door sensor 180 is placed adjacent the door of the mobile asset on the inside of the mobile asset. A magnet mounted to the mobile asset's door triggers magnetic sensor 182 when the door is open or closed. Environmental sensors such as temperature and humidity sensors 187 provide periodic temperature and humidity readings from the rear interior of the mobile asset. These events and readings along with the status of battery 181 are communicated to the mobile asset monitoring device 131 via the wireless sensor hub antenna 124 of cargo sensor 130.

Figure 4:
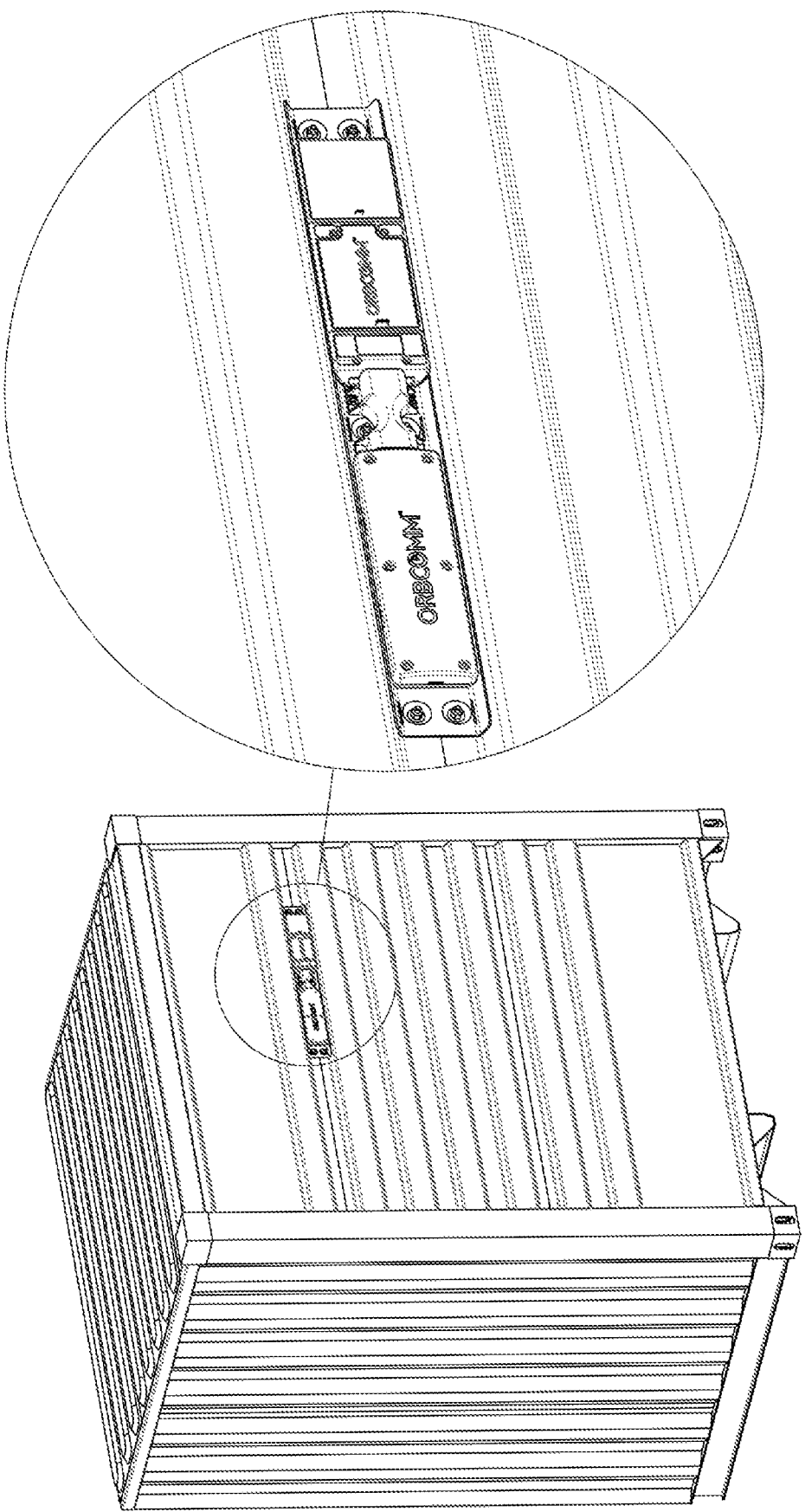
FIG. 4 illustrates the mobile asset monitoring assembly and a typical installation location on the mobile asset.

Cargo sensor 130, combined with cargo detection algorithms in the mobile asset monitoring device 131, detects whether a mobile asset is empty or contains cargo. The mobile asset 401, as shown in FIG. 4, can be a container, trailer, or any other mobile storage vessel. Cargo sensor 130 includes low-profile acoustic horns 101 and ultrasonic transducers 102 mounted within the low-profile acoustic horns 101. The mobile asset monitoring device 131 provides the control signals (not shown) for the cargo sensor and processes the results of the cargo sensor 130.

The horns and transducers are mounted at the nose end of the mobile asset. Multiple horns and transducers are used to detect the presence of objects and cover the entire area of the container. As will be described later in FIG. 8, a short range transducer covers a short range path, e.g., 0 to 15 feet from the transducer. The short range transducer is most effective when objects are placed at the nose end of the container. A medium range transducer covers a medium range path, e.g., from 15 to 30 feet. A long range transducer covers a long range path, e.g., from 30 feet to the end of the mobile asset. Each transducer in turn emits a short pulse of ultrasonic acoustic signal energy having a pattern optimized to cover the short range, medium range and long range paths respectively. The same transducer then receives the return response of the transmitted acoustic signal which is amplified by pre-amplifier 103 and the time-controlled gain (TCG) amplifier 104. The gain of pre-amplifier 103 is controlled by gain control 122 and the gain of TCG amplifier 104 is controlled by compensation network 123. Each amplified return response is then preprocessed by filters 105 and 112 and comparator 106 and envelope detector 113 before being communicated to the mobile asset monitor device 131.

An initial scan is performed by multiplexing-in the short range horn 101 and transducer 102 and triggering the transducer driver 121 one or more times, causing the short range transducer to emit at least one acoustic signal covering the short range path. The short range transducer then receives at least one corresponding return response based on the at least one acoustic signal. The at least one return response from the short range transducer is communicated to the mobile asset monitoring device 131. If the mobile asset monitoring device 131 determines from the at least one response that cargo has been detected, the mobile asset monitoring device 131 then typically disables further scans. If, however, the mobile asset monitoring device 131 determines from the at least one response of the short range transducer that cargo has not been detected, the mobile asset monitoring device 131 sends control signals to multiplex in the medium range horn 101 and transducer 102 and to trigger the transducer driver 121 one or more times to perform another scan. The medium range transducer emits at least one acoustic signal covering the medium range path. The at least one return response from the medium range transducer is communicated to the mobile asset monitoring device 131. If the mobile asset monitoring device 131 determines from the at least one response that cargo has been detected, the mobile asset monitoring device 131 then typically disables further scans. If, however, the mobile asset monitoring device 131 determines from the at least one response of the medium range transducer that cargo has not been detected, the mobile asset monitoring device 131 sends control signals to multiplex in the long range horn 101 and transducer 102 and to trigger the transducer driver 121 one or more times to perform another scan. The long range transducer emits at least one acoustic signal covering the long range path. The at least one return response from the long range transducer is communicated to the mobile asset monitoring device 131. If the mobile asset monitoring device 131 determines from the at least one return response of the long range transceiver that cargo has been detected, the mobile asset monitoring device 131 then typically disables further scans. If, however, the mobile asset monitoring device 131 determines from the at least one response of the long range transducer that cargo has not been detected, the mobile asset monitoring device 131 makes the determination that the mobile asset is empty.

Figure 3:
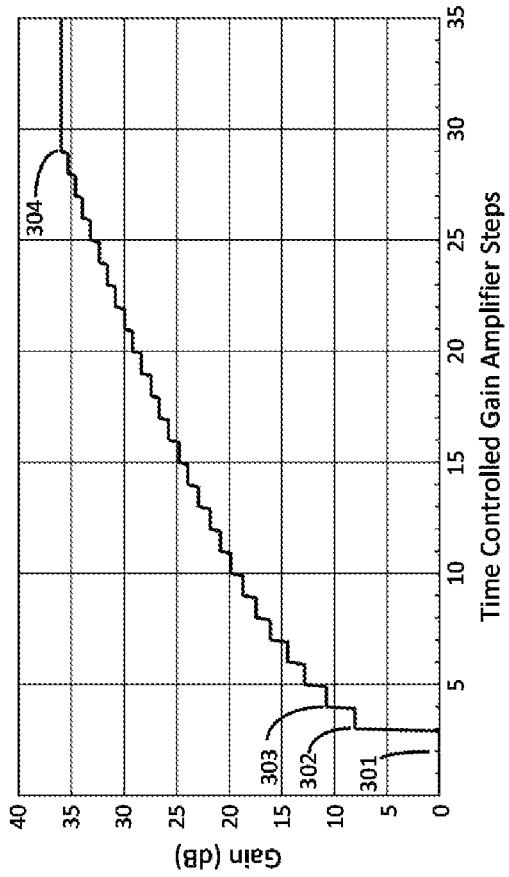
FIG. 3 is a graph showing the response of the time controlled gain amplifier.

To facilitate detection of cargo returns, some analog signal processing is applied. This includes a TCG amplifier 104, compensation network 123, filter 105, filter 112, a 1-bit fixed threshold comparator 106 and envelope detector 113. The TCG amplifier 104 increases amplification for more distant/delayed returns. As shown in FIG. 3, amplification increases from 0 dB 301 to a maximum value 304 in small steps 302, 303 as the TCG counter advances in time. The compensation network 123 takes into consideration the environmental factors from temperature and humidity sensors 187 from door sensor 180 and temperature and humidity sensors 120 from cargo sensor 130 and affects the TCG amplifier gain to compensate for acoustic propagation losses.

Cargo sensor 130 can provide two types of data to the mobile asset monitoring device 131: binary data, as output by comparator 106, and analog data as output by envelope detector 113. The output of TCG amplifier 104 is filtered to the frequency band of interest using filter 105 in the case of binary data and/or filter 112 in the case of analog data. The output of filters 105 and 112 are applied to comparator 106 and envelope detector 113, respectively. Comparator 106 transforms the response into binary form and the envelope detector, if used, provides the return response in analog form at the output of cargo sensor 130.

Figure 2:
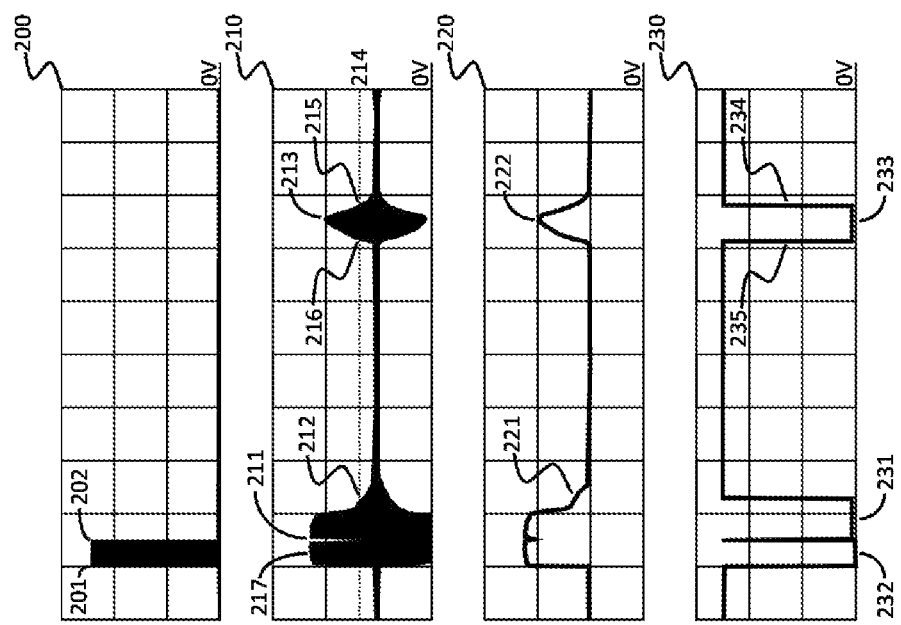
FIG. 2 is a number of simplified typical voltage waveforms captured at various points in the system.

Referring to FIG. 2, waveform 200 is a voltage measured at the input to the transducer driver 121 of FIG. 1. Waveform 200 directs the selected ultrasonic transducer of ultrasonic transducers 102 to emit a pulse of acoustic signal to begin a scan of the mobile asset. Waveform 210 is an output of the TCG amplifier 104 showing the acoustic signal pulse 217 from the selected ultrasonic transducer. Once the transmission is completed 211 and the residual transmit energy 212 in the transducer has dissipated, the receiver monitors the return signal for one or more cargo returns. The dissipation of the residual transmit energy is also known as the ring-down effect. The ring-down time is the transducer decay time after the active transmission phase terminates at 202 and 211. A cargo return 213 is shown with leading edge 216 and trailing edge 215. Waveform 220 shows the return response with cargo return 222 after passing through envelope detector 113. Waveform 230 shows the transmission 232 from the selected transducer, the ring-down 231 and the cargo return 233 after passing through the 1-bit comparator 106. As will be explained in more detail below, the mobile asset monitoring system determines from the return response if the mobile asset is empty or contains cargo. In the case of waveform 230, determination of whether the mobile asset is empty or not is based in part on whether the amplitude of the return response crosses the predetermined comparator threshold (output signal goes low) for a minimum amount of time.

Wireless sensor hub antenna 124 is in communication with wireless sensor hub 125 of the mobile asset monitoring device 131 to ensure wireless communication of data from door sensor 180 to the mobile asset monitoring device 131. The wireless communication via the wireless sensor hub antenna 124 of the cargo sensor 130 between door sensor 180 and wireless sensor hub 125 of the mobile asset monitoring device 131 forms a local wireless network. This local wireless network also allows a user smart device 186 to communicate with the wireless sensor hub 125 and the wireless sensor node 183 of door sensor 180. The smart device 186 runs provisioning and diagnostic applications than can be used for factory testing, installation and subsequent servicing. For example, the provisioning and diagnostic applications can be used to run factory test commands, set or change operating parameters, activate asset monitoring after customer installation, trigger and display the results of cargo scans, and run automated customization routines to adjust dead zones on a per asset basis.

Next, the mobile asset monitoring device 131 will be explained with reference to FIG. 1. The mobile asset monitoring device 131 is battery-powered through rechargeable battery 117. Battery 117 is also used to power cargo sensor 130. Solar panel 119 is used to recharge (163) battery 117, creating an autonomously powered system. An autonomously powered mobile asset monitoring system without any external cabling is desirable in many applications and significantly reduces installation time. Optionally, asset power 126 can be used when available to recharge battery 117 and provide power. Power and battery management is provided by power manager 118 under control of microprocessor 107. Other power sources, such as thermo-electric, vibration and energy storage devices, such as super capacitors, can be employed without departing from the spirit of the present invention. Selection of power sources and energy storage devices are dictated by the needs of the application.

In one preferred embodiment, a single microprocessor 107 controls both the mobile asset monitoring device 131 and the cargo sensor 130. While data flow is shown in FIG. 1, control signals from microprocessor 107 have been omitted for clarity. Furthermore, distribution of the microprocessor function across multiple devices for power consumption, processing capability or cost reduction reasons can be employed without departing from the spirit of the present invention.

The output of comparator 106 is sent to microprocessor 107 for data processing and analysis. The output of envelope detector 113, if used, is passed through analog-to-digital converter 114 and the resulting digital signal is passed to microprocessor 107. As mentioned above, an objective of the mobile asset monitoring system is to provide actionable data to transportation and logistics fleet management systems and personnel. This actionable data is transmitted to database 111 of backend infrastructure 132 over wireless communications network 109 and accessed via asset monitoring system server 110. Overall, the backend infrastructure 132 is connected to all mobile asset monitoring devices over wireless communications network 109.

Wireless communication network 109 can be comprised of many networks and even networks of networks. In general terms, the network (or networks) 109 employed by the present invention falls into two categories: terrestrial and satellite. Typically, terrestrial networks are broadband and satellite networks are narrowband. The definition of narrowband and broadband varies significantly depending on the application, but because of the relatively modest data transfer requirements of the proposed invention, anything above 100 kbps will be considered broadband.

The mobile asset monitoring device 131 is connected to network 109 via one or more broadband 108 and/or narrowband 115 wireless transceivers. The mobile asset monitoring device 131 is also connected to a global navigation satellite system (GNSS) 176. The mobile asset monitoring device 131 comprises a GNSS wireless receiver 174 for receiving signals from the GNSS satellites 176.

FIG. 4 depicts the installation of cargo sensor 404 and the mobile asset monitoring device 405 on mobile asset 401. The mobile asset 401 depicted in FIG. 4 has corrugations on its external surface. Since the corrugations create recesses, cargo sensing device 404 and the mobile asset monitoring device 405 can be easily installed within one of the recessed corrugations as denoted by 402.

As shown in the zoomed view of the installation on mobile asset 401, cargo sensor 404 and the mobile asset monitoring device can be mounted on bracket 400. Electrical connections 154, 160, and 177 between cargo sensor 130 and the mobile asset monitoring device 131 as well as the RF cable connection 169 between the wireless sensor hub 125 and the wireless sensor hub antenna 124 are protected by cable cover 406. As well, the solar panel and battery pack combination 407 can also be installed on bracket 400. The resulting overall system is compact and is easily installed on mobile asset 401 using rivets, or other suitable fasteners. Each of the system components, namely the cargo sensor 404, the mobile asset monitoring device 405, the cable cover 406 and the solar panel and battery pack combination 407, are designed to fit into recessed corrugation 402 without any protrusion thus protecting all the system components from damage. However, this compact design may be at the expense of the performance of solar panel 119 and wireless links 156 and 161 to and from network 109 (as shown in FIG. 1) as well as the wireless link to the GNSS satellites 176.

Figure 5:
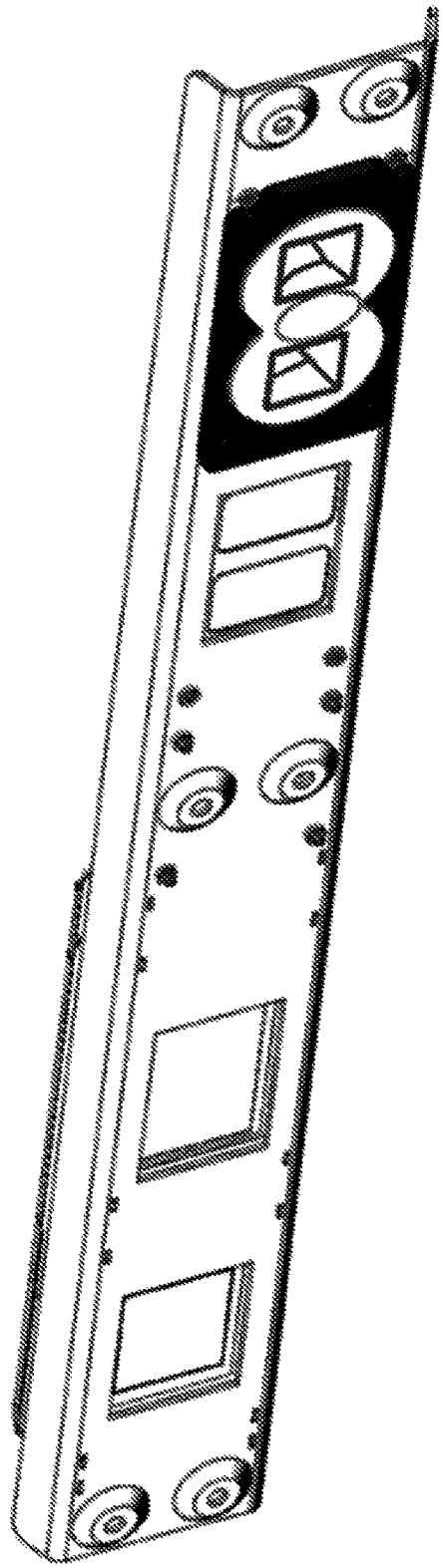
FIG. 5 illustrates the back side of the mobile asset monitoring assembly that seals against the mobile asset.

FIG. 5 shows a rear view of bracket 400. Because mobile asset 401 is typically clad in metal, signal propagation from the outside of mobile asset 401 to wireless sensors on the inside of mobile asset 401, such as door sensor 180, can be difficult. In order to ensure a reliable wireless link and provide the low profile acoustic horns 101 of cargo sensor 130, 404 with access to the interior of mobile asset 401, a hole is drilled in mobile asset 401. This single hole is shared between the wireless sensor hub antenna 124 of the cargo sensor and the low-profile acoustic horns 101. To facilitate maintaining the environmental integrity of mobile asset 401 around this hole, a single gasket seal 502 fastened to cargo sensor 404 is used. When bracket 400 with cargo sensor 404 is attached to the exterior of mobile asset 401, the single gasket seal 502 is ranged between cargo sensor 404 and the outer surface of mobile asset 401 surrounding the hole. The single gasket seal 502 includes an interior cut-out portion 503 that corresponds to the non-fastener-related single hole that is drilled into mobile asset 401.

Figure 6:
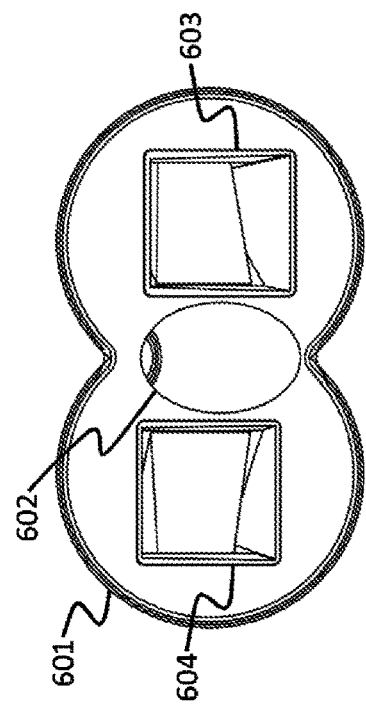
FIG. 6 illustrates the mobile asset monitoring assembly mounted to the mobile asset and viewed from the inside of the mobile asset.

FIG. 6 shows a zoomed in view of hole 601 that is drilled into mobile asset 401. As mentioned above, hole 601 ensures a reliable wireless link between the sensors in the interior of mobile asset 401 and the wireless sensor hub antenna 124 of cargo sensor 130, as well as provides the low profile acoustic horns 101 of cargo sensor 130 with access to the interior of mobile asset 401. Sharing hole 601 between the wireless sensor hub antenna 124 and the low-profile acoustic horns 101 of the corresponding short-range, medium-range and long-range ultrasonic transducers 102 avoids the need to drill additional holes in mobile asset 401. The short-range horn is denoted by 602, the medium-range horn is denoted by 603, and the long-range horn is denoted by 604.

Figure 7A:
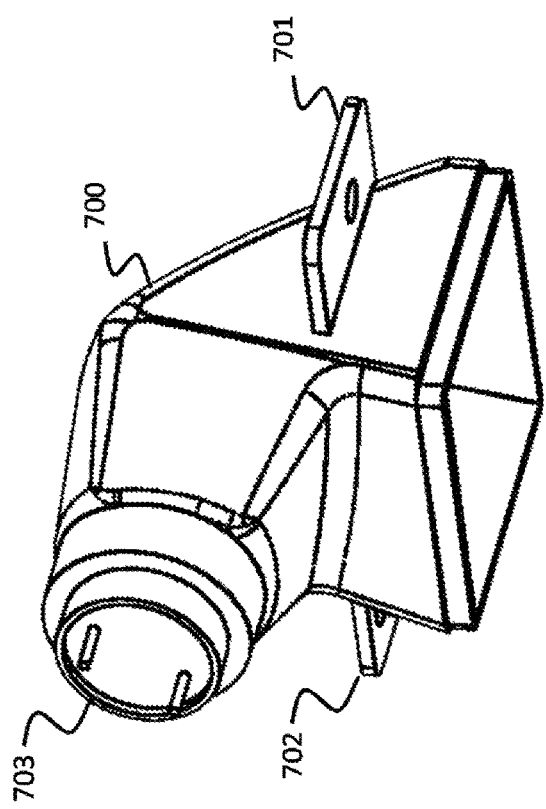
FIGS. 7A and 7Ba illustrate a low-profile right-angle horn and a simplified cross section.

In a preferred embodiment of the invention, right-angle horns are used for the medium-range horn 603, and the long-range horn 604. The low profile nature of these right-angle horns makes them good candidates for fitting within corrugation 402 of mobile asset 401 while providing enough gain to reliably detect cargo within their respective ranges. FIG. 7a shows a perspective view of a low-profile acoustic horn assembly used in the present invention. The low-profile acoustic horn assembly includes right-angle horn 700, complete with mounting tabs 701 and 702, and transducer 703.

Figure 7B:
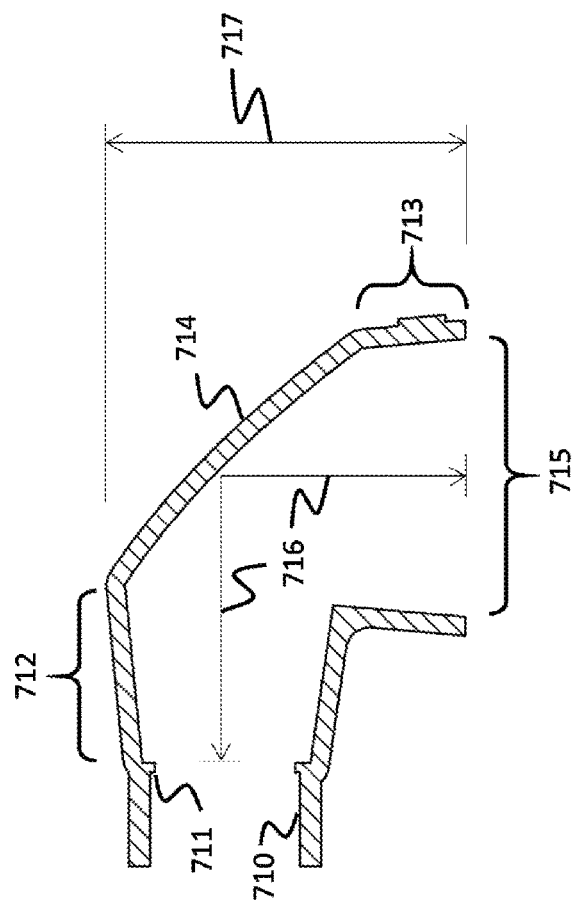

FIG. 7b shows a cross-section of a low-profile right-angle acoustic horn including transducer retention sleeve 710, transducer stop 711, flared sections 712 and 713, and parabolic reflector 714. Parabolic reflector 714 and flared sections 712 and 713 are designed to direct acoustic signals from the center of transducer 703 to the target range and to focus the return signals from the target range back to the center of transducer 703. The gain of the horn is a measure of how well the horn performs these two functions and is generally a function of the size of parabolic reflector 714, the size of horn aperture 715 and the effective length of the horn 716. By using a parabolic reflector to both focus the acoustic signals and redirect them by 90 degrees, the effective length and thus gain of the horn can be increased while limiting the profile or depth 717 of the horn.

Figure 8:
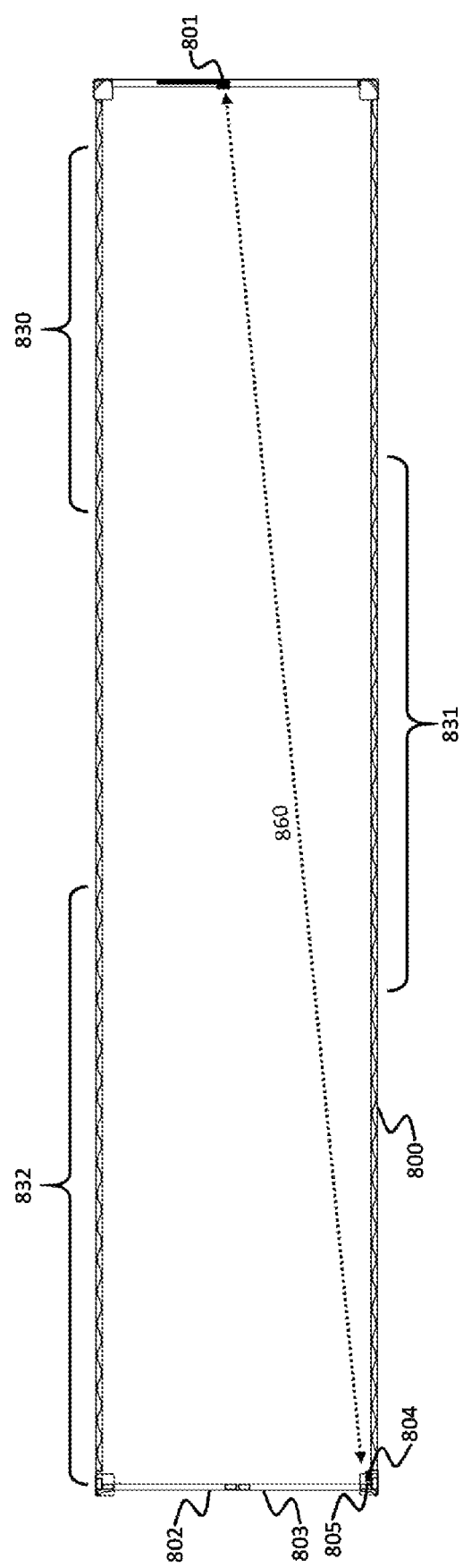
FIG. 8 illustrates a top view of an installation on a trailer-type mobile asset.

FIG. 8 shows how the present invention would be implemented in a trailer-type mobile asset 800. A top view of mobile asset 800 is shown. Trailer 800 has two ends: nose end 801 and door end 802. Cargo sensor 130 and mobile asset monitoring device 131 are placed at nose end 801 of trailer 800. The door of trailer 800 is denoted by 803 and is located at door end 802 of trailer 800. Adjacent to door 803 is door sensor 180. Door sensor 180 comprises magnetic sensor 182, 804. Magnet 805, mounted to door 803 triggers magnetic sensor 182, 804 when door 803 is opened or closed. These events along with the status of battery 181 (not shown in FIG. 8) of the door sensor and periodic temperature and humidity readings from the temperature and humidity sensors 187 (not shown in FIG. 8) are communicated back to the wireless sensor hub 125 of the mobile asset monitoring device 131 via the wireless sensor hub antenna 124 of cargo sensor 130. The readings from the temperature and humidity sensors 187, 120, which are located at opposite ends 801, 802 of trailer 800, are important for refrigerated applications, but also can be used to better compensate for temperature and humidity effects on acoustic propagation for cargo sensing.

Also shown in FIG. 8 are the optimal transducer ranges. The short-range or zone 1 transducer is optimized for a short-range path as denoted by 830. The medium-range or zone 2 transducer is optimized for a medium-range path as denoted by 831. The long-range or zone 3 transducer is optimized for a long-range path, as denoted by 832. Despite being optimized for specific ranges, each transducer can still receive and detect return responses from well beyond their optimal ranges. For example, the short-range transducer is optimized to receive a return response from the portion of the asset closest to the transducer. The short-range transducer, however, can still receive return responses from medium-range distances, and even long-range distances. As a result, there is significant overlap between the full useable ranges or zone limits of each transducer. This redundancy can be used to improve detection reliability by covering dead zones introduced to eliminate structure-related returns.

The wireless link between cargo sensor 130 and door sensor 180 in FIG. 8 is denoted by 860. The wireless sensor hub antenna 124 and wireless sensor node 183 of door sensor 180 are connected over a low power protocol such as Bluetooth low energy (BLE). Power management is very important for door sensor 180 as it is powered from battery 181 and does not have a recharge source. The use of wireless technology to connect cargo sensor 130 with door sensor 180 is required to enable rapid installation of the system on a fully-loaded asset. Installation of a wired connection over the entire length of trailer 800 would be very time consuming on an empty asset and impossible on a fully-loaded asset.

System Optimization

Figure 9:
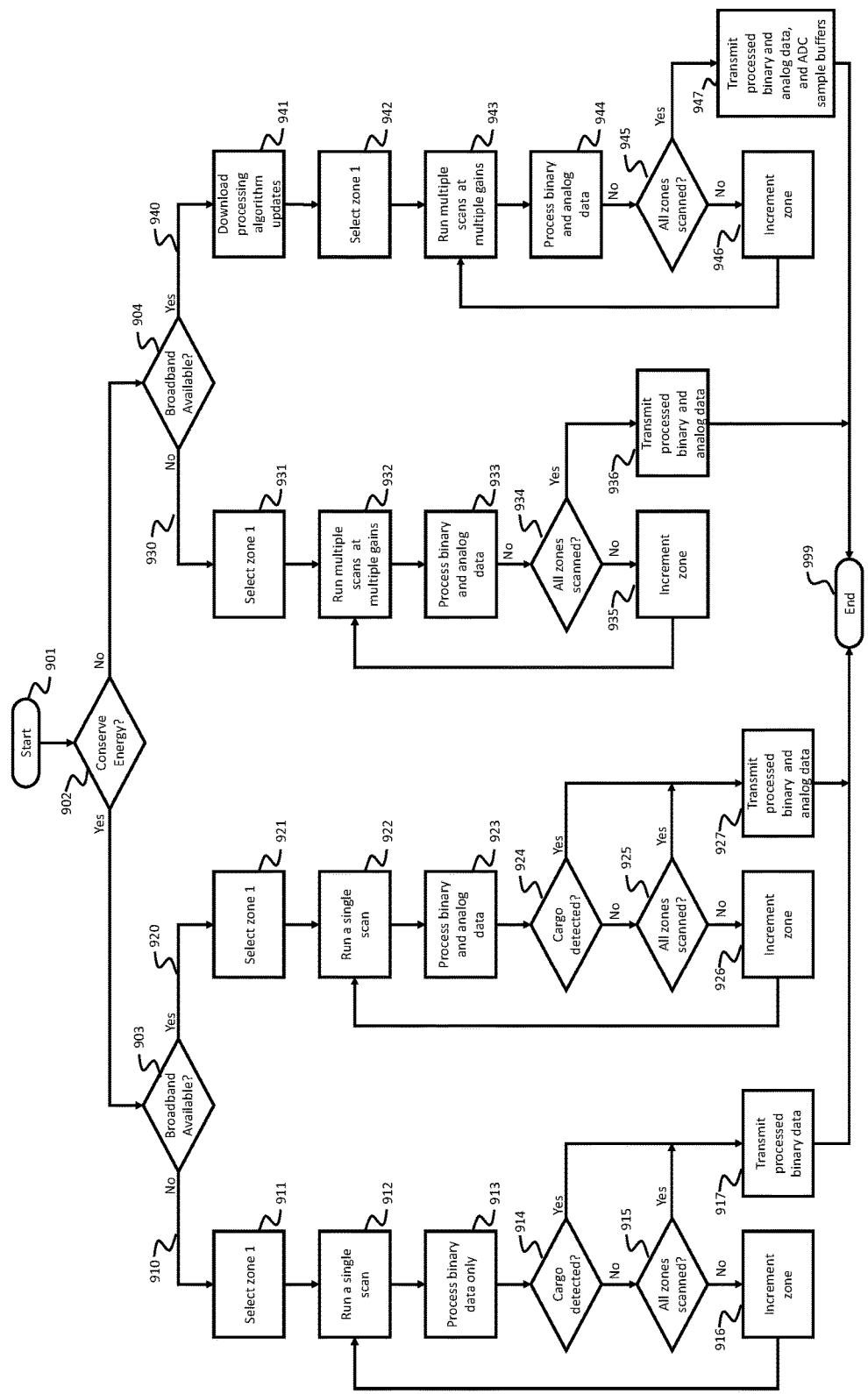
FIG. 9 is a flowchart illustrating how the present invention manages power and makes efficient use of network bandwidth.

As mentioned above, the present invention aims to take advantage of broadband terrestrial network access when available and manage available power to provide optimized asset monitoring under given conditions. FIG. 9 shows a flowchart depicting how the present invention optimizes asset monitoring depending on the available resources. The process, which is run by the mobile asset monitoring device 131, controls scanning of cargo sensor 130. The process begins at step 901. From step 902, the system chooses one of four modes:

1. Energy conservation with narrowband satellite network access as denoted by branch 910
2. Energy conservation with broadband terrestrial network access as denoted by branch 920
3. Energy sufficient with narrowband satellite network access as denoted by branch 930
4. Energy sufficient with broadband terrestrial network access as denoted by branch 940

At step 902, the process determines whether energy conservation is required due to energy source limitations. For example, during the winter, daylight hours are reduced thus limiting the capacity of the solar panel. In such a situation, energy conservation will be a factor. The process will then choose energy conservation and proceed to step 903.

At step 903, the process determines whether broadband terrestrial network access is available. If it is not available, the process relies on narrowband satellite network access and mode 1 is selected as denoted by branch 910. At step 911, the process first selects zone 1 for scanning. At step 912, a single scan of the selected zone is performed. At step 913, only the binary data is processed. Step 914 checks to see if the processed data indicates that cargo is detected. If so, the process proceeds to step 917 and the processed binary data is transmitted to the backend infrastructure 132. The cargo scanning process then terminates at step 999. If cargo is not detected at step 914, the process then checks to see if all zones have been scanned yet. If so, the process again proceeds to step 917 where all the processed binary data is transmitted to the backend infrastructure 132 and then terminates at step 999. However, if all zones have not yet been scanned at step 915, the process selects the next zone for scanning (step 916) and returns to step 912 so the scanning process can repeat until either cargo is detected or all the zones have been scanned.

If at step 903 the process determines that broadband terrestrial network access is available, then mode 2 is selected and the process continues down branch 920. At step 921, the process first selects zone 1 for scanning. At step 922, a single scan of the selected zone is performed. At step 923, both the binary and analog data is processed. Step 924 checks to see if the processed data indicates that cargo is detected. If so, the process proceeds to step 927 and the processed binary and analog data is transmitted to the backend infrastructure 132. The cargo scanning process then terminates at step 999. If cargo is not detected at step 924, the process then checks to see if all zones have been scanned yet. If so, the process again proceeds to step 927 where all the processed binary and analog data is transmitted to the backend infrastructure 132 and then terminates at step 999. However, if all zones have not yet been scanned at step 925, the process selects the next zone for scanning (step 926) and returns to step 922 so the scanning process can repeat until either cargo is detected or all the zones have been scanned.

At step 902, the process may determine that energy conservation is not required. This may happen, for example, during the summer months when more than half of each day is in daylight, and the solar panel is more effective. As energy conservation is not a factor, multiple scans can be run to provide more accurate results. The process will thus choose not to conserve energy and proceed to step 904.

At step 904, the process determines whether broadband terrestrial network access is available. If it is not available, narrowband satellite network access (mode 3) is selected and the process continues down branch 930. At step 931, the process first selects zone 1 for scanning. At step 932, multiple scans of the selected zone are performed using different gain settings. At step 933, both the binary and analog data for each scan is processed. Since energy consumption is not an issue in mode 3, this branch does not terminate scanning as soon as cargo is detected. Accordingly, step 934 simply checks to see if all zones have been scanned yet. If so, the process proceeds to step 936 where all the processed binary and analog data is transmitted to the backend infrastructure 132 and then terminates at step 999. However, if all zones have not yet been scanned at step 934, the process selects the next zone for scanning (step 935) and returns to step 932 so the scanning process can repeat until all the zones have been scanned.

If at step 904 the system determines that broadband terrestrial network access is available, then mode 4 is selected and the process continues down branch 940. In mode 4 multiple scans are used by microprocessor 107 to optimize the cargo detection algorithm and improve the algorithm robustness so it can better distinguish between actual cargo and inconsequential items such as pallets and mats, or even mobile asset features such as dents and/or corrugations, that may otherwise result in a false positive cargo detection.

Branch 940 (mode 4) begins at step 941 where the mobile asset monitoring device 131 communicates with the backend infrastructure 132 to determine if there are any updates to the cargo detection processing algorithms and if so, downloads them.

The process then continues to step 942 where zone 1 is selected for scanning. At step 943, multiple scans of the selected zone are performed using different gain settings. At step 944, both the binary and analog data for each scan is processed. Since energy consumption is not an issue in mode 4, this branch does not terminate scanning as soon as cargo is detected. Accordingly, step 945 simply checks to see if all zones have been scanned yet. If so, the process proceeds to step 947 where all the processed binary and analog data is transmitted to the backend infrastructure 132 along with the unprocessed analog data which may be used for further analysis or diagnostic and algorithm verification purposes. Further analysis could include more complex post processing performed at the server 110 to improve accuracy. The post processing could include compensating for temperature and humidity and processing at multiple gain levels. The processing could further include combining multiple scans to reduce noise through averaging, extending dynamic range by combining multiple scans at different gain levels and using statistical analysis to identify and eliminate structural reflections. The process then terminates at step 999. However, if all zones have not yet been scanned at step 945, the process selects the next zone for scanning (step 946) and returns to step 943 so the scanning process can repeat until all the zones have been scanned.

Cargo Detection Algorithms

The mobile asset monitoring system contains cargo sensing algorithms that use the data received from the cargo sensor to determine whether cargo is present in the mobile asset. Prior systems rely on a fixed threshold analysis that compared the return response from the transducers with a fixed threshold. In a fixed threshold system, if the return response from the transducer scans exceeds the predetermined threshold, it is determined that the mobile asset contains cargo. If the return response from the transducer scans is lower than the predetermined threshold, it is determined that the mobile asset is empty. While these prior systems appear simple and straightforward, they do not take into account the signal noise that is included in the return response. Signal noise can result from noise external to the mobile asset, random reflections from structural features inside the mobile asset and even noise created from the transducers themselves. If the return response is very noisy, then fixed threshold analysis will result in a significant number of false positive results.

To avoid this undesirable situation, the present invention takes the noise into account by using curve-fitting based algorithms to detect the presence of cargo. When curve-fitting is used, the effects of noise spikes and structural reflections are significantly reduced and false positive results are minimized. It should be noted that cargo will typically be detected simultaneously by more than one of the following algorithms.

The algorithms used in the present invention all use the logarithm of the linear ADC values of the return response received from a corresponding transducer that is optimized to scan a given zone. Accordingly, the linear ADC values $z_i$ from each transducer are first converted into logarithmic values $y_i$ as follows:

$$y_i = 20 \log(z_i), i=1, 2, \ldots n$$

where i represents the sample number and n is the number of data samples collected. Although the above equation uses the common logarithm function and then multiplies by 20 such that the resulting $y_i$ values are in decibels (dB), other embodiments of the invention may use different logarithms and/or scaling values without departing from the spirit of the present invention.

To construct a curve fit f(x) for each return response dataset (x, y) where x represents distance/time and y is the logarithmic data calculated above, the coefficients $a_0$, $a_1$, \ldots $a_j$ of the $j^{th}$ order polynomial $$f(x) = \sum_{k=0}^{j} a_k x^k$$

that minimize the squared error $$err = \sum_{i=1}^{n} (y_i - f(x_i))^2$$

are calculated. In one preferred embodiment of the invention, j=5; however, other order polynomials could also be used without departing from the spirit of the present invention. One method to find these coefficients for each return response is to solve the following set of simultaneous equations expressed in matrix form:

$$\begin{bmatrix} n & \sum x_i & \sum x_i^2 & \ldots & \sum x_i^j \\ \sum x_i & \sum x_i^2 & \sum x_i^3 & \ldots & \sum x_i^{j+1} \\ \sum x_i^2 & \sum x_i^3 & \sum x_i^4 & \ldots & \sum x_i^{j+2} \\ \vdots & \vdots & \vdots & & \vdots \\ \sum x_i^j & \sum x_i^{j+1} & \sum x_i^{j+2} & \ldots & \sum x_i^{j+j} \end{bmatrix} \begin{bmatrix} a_0 \\ a_1 \\ a_2 \\ \vdots \\ a_j \end{bmatrix} = \begin{bmatrix} \sum y_i \\ \sum (x_i y_i) \\ \sum (x_i^2 y_i) \\ \vdots \\ \sum (x_i^j y_i) \end{bmatrix}$$

By using fixed sample intervals and fixed-length data buffers, the components of the left-hand matrix become constants which can be pre-calculated. In fact, in some embodiments of the present invention, the Gaussian elimination equations to solve for $a_0$, $a_1$, \ldots $a_j$ can also be predetermined eliminating the need for the left matrix altogether and leaving only the components of the right-hand matrix to be calculated and used in the Gaussian elimination equations.

The logarithmic data $(x_i, y_i)$, the curve fit data $f(x_i)$, or both are then used in the following algorithms which are applied independently to each return response in turn.

Maximum Curve Fit

The maximum curve fit algorithm finds the maximum value of $f_{max}$ of $f(x_i)$ $$f_{max} = \max f(x_i)$$

for all available $x_i$ representing distances from the transducer that fall within the defined zone limits. For example, if the sampled $x_i$ values correspond to distances of 15 to 58 feet from the transducer and the corresponding zone limits are 14 to 50 feet, the maximum curve fit would be calculated for only the $x_i$ values corresponding to 15 to 50 feet.

Once the value of $f_{max}$ is determined for each return response, it is then compared to an adjustable threshold. If $f_{max}$ for one of the responses is greater than the adjustable threshold, then the cargo sensing system of the present invention determines that the mobile asset contains cargo.

This algorithm provides detection coverage of large returns not detected by the following other algorithms. This algorithm determines the value of $f_{max}$ but other embodiments of the invention may use other characteristics of the curve fit besides the maximum value to compare with the adjustable threshold without departing from the spirit of the present invention.

Average Curve Fit: Less than $x_A$ Feet vs Greater than $x_B$ Feet

As previously described, the full useable range of each transducer extends well beyond its optimal zone. The average curve fit algorithm uses this fact and compares the average return response of each of the transducers from the first $x_A$ feet of the asset to the corresponding average return response of the transducer from $x_B$ feet to the end of the useable zone, $x_z$.

Using the curve fit determined above, the average value, A, of the fitted curve over the sampled $x_i$ values for $x_i=0$ to $x_A$ feet is calculated.

$$A = \operatorname{avg} f(x_i), x_i \leq x_A$$

For example, if the first $x_i$ sample corresponds to 2 feet, then the average would be calculated for $x_i=2$ to $x_A$ feet. Note that the value of $x_A$ may change, depending on the asset type and/or installation position.

Next, the average value, B, of the fitted curve is calculated over the sampled $x_i$ values for $x_i=x_B$ feet to the end of the zone, $x_z$, $$B = \operatorname{avg} f(x_i), x_B \leq x_i \leq x_z$$

For example, if the sampled $x_i$ values correspond to distances of 2 to 43 feet from the transducer and $x_B$=10 feet and $x_z$=45 feet, then the average would be calculated for $x_i$=10 to 43 feet. Note that the value of $x_B$ may change, depending on the asset type and/or installation position.

Once the values of A and B are determined for each return response of a corresponding transducer, the difference between the values A and B are compared to another adjustable threshold. If A–B is greater than this adjustable threshold, then the cargo sensing system of the present invention determines that the mobile asset contains cargo.

This algorithm is most useful when cargo is located at or near the nose of the mobile asset.

Log Data vs Curve Fit: Less Than $x_C$ Feet

In some instances, it may be beneficial to use the logarithmic data of the return response. While the curve fit generally removes noisy samples that may result in false positive results, it is possible that a response spike may actually indicate the presence of cargo, and not necessarily noise. Accordingly, the present algorithm compares the logarithmic data of the return response with the curve fit data.

The present algorithm also takes into account certain anomalies that may be present in the return response such as the ring-down effect and dead zones. As shown in waveforms 210 and 220 of FIG. 2, when the transducer emits an acoustic signal, a ring-down effect 212, 221 is observed. The ring-down effect (i.e. transducer decay time) is the interval of time following the active transmission phase of the acoustic pulse over which the transducer continues to "ring"—like a bell after it is struck. Since the return response is detected by the same transducer that transmits the acoustic pulse, the return response includes the transmitted acoustic pulse 217 and the ring-down 212, both of which prevent detection or interpretation of the echoes (return response) until the ring-down finishes and the transducer is ready to receive the return response. For this reason, sampling of the return response does not begin until after the ring-down has had a chance to decay. The ring-down duration, however, is different for each transducer, so even though the start of sampling is delayed, the return response may still capture part of the ring-down. Because ring-down is an anomaly associated with the transducer and is not indicative of the actual return response, it is removed from the logarithmic data by deleting all initial samples up to the point that the following sample is not less than the current sample or is beyond a certain distance/time, for example four feet.

As well as the ring-down samples, other samples falling within "dead zones", where false cargo echoes typically appear, are also removed. Dead zones can occur as a result of structural features of the mobile asset such as roof struts or corrugations. In the present algorithm, dead zone samples are removed from the logarithmic data by deleting all samples that fall within the defined dead zones. Dead zones are variable and can be assigned on a per asset basis.

Once the ring-down and dead zone samples have been removed, the present algorithm calculates the maximum difference, C, between the logarithmic data for each return response and the corresponding value of the fitted curve for all remaining $x_i$ samples where $x_i \leq x_C$ feet, for example ten feet.

$$C = \max(y_i - f(x_i)), x_i \leq x_C$$

Note that the fitted curve will include the ring-down, but the logarithmic curve will not include the ring-down. If the system determines that C is greater than an adjustable threshold, such as 15 dB, for any of the zones, then the cargo sensing system of the present invention determines that the mobile asset contains cargo. Note that the value of $x_C$ may change, depending on the asset type and/or installation position.

This algorithm is most useful when cargo is located near the front but not at the nose of the mobile asset.

Log Data vs Curve Fit: Greater than $x_D$ Feet

Similar to the algorithm above, once the ring-down and dead zone samples have been removed, the present algorithm also calculates the maximum difference between the logarithmic data for each return response and the corresponding value of the fitted curve for all remaining $x_i$ samples where $x_i$ is less than the maximum zone limit, $x_z$, and $x_i \geq x_D$ feet, for example ten feet.

$$D = \max(y_i - f(x_i)), x_D \leq x_i \leq x_z$$

If the system determines that D is greater than another adjustable threshold, such as 12 dB, for any of the zones, then the cargo sensing system of the present invention determines that the mobile asset contains cargo. Note that the value of $x_D$ may change, depending on the asset type and/or installation position.

This algorithm is most useful when cargo is located further back in the mobile asset.

The embodiments of the invention in which an exclusive property or privilege is claimed are defined as follows:

1. A method of optimizing operation of an autonomous wireless mobile asset monitoring system comprising at least one transceiver which detects presence of cargo in a mobile asset which comprises at least one zone, the method comprising:
   i. if energy conservation is a requirement of the system, scanning each zone until cargo is detected in one of the zones and transmitting data comprising results of the scanning to a backend infrastructure, wherein scanning comprises emitting at at least one acoustic signal from the at least one transceiver; or
   ii. if energy conservation is not a requirement of the system, scanning every zone and transmitting data comprising results of the scanning to a backend infrastructure, wherein the scanning comprises emitting multiple acoustic signals from the at least one transceiver.

2. The method of claim 1, wherein the scanning further comprises:
   iii. the at least one transceiver receiving at least one return signal and transmitting the at least one return signal to a processor;
   iv. applying at the processor at least one cargo detection algorithm to the at least one return signal to generate data which indicates presence or absence of cargo.

3. The method of claim 2, wherein the data which indicates the presence or absence of cargo is transmitted to a backend infrastructure:
   if energy conservation is a requirement of the autonomous wireless mobile asset monitoring system and if the data is transmitted over a satellite network, the data comprises only binary scanning results;
   if energy conservation is not a requirement of the autonomous wireless mobile asset monitoring system and if the data is transmitted over a broadband network, the data comprises the binary scanning results, analog scanning results, and the at least one return signal;
   otherwise the data comprises the binary and analog scanning results.

4. The method of claim 1, wherein the autonomous wireless mobile asset monitoring system comprises two or more transceivers and the mobile asset comprises two or more zones an area of overlap exists between adjacent zones and the area of overlap is scanned by multiple transceivers as part of each encompassing zone resulting in improved detection reliability by covering dead zones introduced to eliminate structure-related returns.

5. An autonomous wireless mobile asset monitoring system for detecting presence or absence of cargo in a mobile asset, comprising:
- a door sensor for detecting whether a door of the mobile asset is in a closed or open state;
- a cargo sensor comprising at least one ultrasonic transceiver for emitting acoustic signals in the mobile asset and receiving return acoustic signals based on the transmitted acoustic signals, wherein the cargo sensor is configured to emit at least one acoustic signal from the at least one ultrasonic transceiver for scanning an interior of the mobile asset;
- a mobile asset monitoring device that processes data representative of the return acoustic signals to determine, using at least one cargo detection algorithm, the presence or absence of cargo in the mobile asset; and
- a battery for powering the cargo sensor and the mobile asset monitoring device.

6. The autonomous wireless mobile asset monitoring system of claim 5, further comprising a mobile device that communicates with the door sensor and the cargo sensor, wherein the mobile device comprises a processor containing instructions that permit a user to perform a diagnostic operation of the autonomous wireless mobile asset monitoring system.

7. The autonomous wireless mobile asset monitoring system of claim 5, wherein the cargo sensor comprises a wireless sensor hub antenna that permits wireless communication between the door sensor and the mobile asset monitoring device.

8. The autonomous wireless mobile asset monitoring system of claim 7, wherein the cargo sensor comprises at least one low-profile acoustic horn antenna, wherein the at least one ultrasonic transducer is mounted within a corresponding low-profile acoustic horn antenna, and wherein the wireless sensor hub antenna is mounted in proximity to the at least one low-profile acoustic horn antenna such that when the autonomous wireless mobile asset monitoring system is mounted to the mobile asset, the wireless sensor hub antenna and the at least one low-profile acoustic horn antenna share access to a hole drilled into the mobile asset.

9. The autonomous wireless mobile asset monitoring system of claim 5, further comprising a server that processes the data at multiple gain levels.

10. The autonomous wireless mobile asset monitoring system of claim 2, further comprising a server that processes the data to compensate for temperature and humidity.

11. The autonomous wireless mobile asset monitoring system of claim 5, further comprising a solar panel to recharge the battery.

12. The autonomous wireless mobile asset monitoring system of claim 5, wherein the door sensor and the cargo sensor each comprise environmental sensors which provide environmental readings of the interior of the mobile asset, wherein the cargo sensor comprises a compensation network which compensates for acoustic propagation losses in the acoustic signals based on the environmental readings.

13. The autonomous wireless mobile asset monitoring system of claim 5, further comprising a backend infrastructure for storing the analog and/or binary data and for storing the at least one cargo detection algorithm.

14. The autonomous wireless mobile asset monitoring system of claim 13, wherein the backend infrastructure comprises a server, and wherein the server performs further processing of the analog and/or binary data.

15. The autonomous wireless mobile asset monitoring system of claim 5, wherein the interior of the mobile asset comprises a plurality of zone and the cargo sensor is configured to:
- scan ones of the plurality of zones until cargo is detected in one of the zones if energy conservation is a requirement of the system; and
- scan every zone if energy conservation is not a requirement of the system.

16. The autonomous wireless mobile asset monitoring system of claim 5, wherein the data representative of the return acoustic signal is at least one of analog data and binary data.

17. A method of optimizing operation of an autonomous wireless mobile asset monitoring system which detects the presence of cargo in a mobile asset, the autonomous wireless mobile asset monitoring system comprising at least one ultrasonic transceiver for transmitting acoustic signals and receiving return signals based on the transmitted acoustic signals, the at least one ultrasonic transceiver being controlled by a processor, the method comprising:
- determining whether energy conservation is required;
- if energy conservation is required:
  - i. the processor controlling the at least one ultrasonic transceiver to transmit an acoustic signal in a first zone closest to the at least one ultrasonic transceiver, and to receive a first return signal which is sent to the processor for processing using at least one cargo detection algorithm;
  - ii. if the processor determines that cargo is absent based on the previous step, the processor controlling the at least one transceiver to transmit another acoustic signal in a second zone further removed from the at least one ultrasonic transceiver, and to receive a second return signal which is sent to the processor;
  - iii. if the processor determines that cargo is absent based on the previous step, the processor controlling the at least one transceiver to transmit a subsequent acoustic signal in a corresponding subsequent zone even further removed from the at least one ultrasonic transceiver, and to receive a corresponding subsequent return signal which is sent to the processor, the processor controlling the at least one transceiver to continue to transmit subsequent acoustic signals in corresponding subsequent zones until either acoustic signals have been transmitted in all of the zones or the processor determines that cargo is present in one of the zones;
  - iv. the processor transmitting:
    - a. binary data representative of the processed return signal in the one of the zones in which cargo was present, or all the processed return signals to a backend infrastructure for storing or further processing using a narrowband satellite network; or
    - b. binary and analog data representative of the processed return signal in the one of the zones in which cargo was present, or all the processed return signals to a backend infrastructure for storing or further processing using a broadband terrestrial network;

if energy conservation is not required and only a narrowband satellite network is available:
- v. the processor controlling the at least one ultrasonic transceiver to transmit multiple acoustic signals in a first zone closest to the at least one ultrasonic transceiver, and to receive multiple first return signals which are sent to the processor for processing using at least one cargo detection algorithm;
- vi. the processor controlling the at least one transceiver to transmit further multiple acoustic signals in a second zone further removed from the at least one ultrasonic transceiver, and to receive multiple second return signal which are sent to the processor;
- vii. the processor controlling the at least one transceiver to transmit subsequent multiple acoustic signals in a corresponding subsequent zone even further removed from the at least one ultrasonic transceiver, and to receive multiple corresponding subsequent return signals which are sent to the processor, the processor controlling the at least one transceiver to continue to transmit subsequent acoustic signals in corresponding subsequent zones until acoustic signals have been transmitted in all of the zones;
- viii. the processor transmitting binary and analog data representative of all the processed return signals to a backend infrastructure for storing or further processing; or if energy conservation is not required and a broadband terrestrial network access is available:
- ix. the processor controlling the at least one ultrasonic transceiver to transmit multiple acoustic signals in a first zone closest to the at least one ultrasonic transceiver, and to receive multiple first return signals which are sent to the processor for processing using at least one cargo detection algorithm;
- x. the processor controlling the at least one transceiver to transmit further multiple acoustic signals in a second zone further removed from the at least one ultrasonic transceiver, and to receive multiple second return signal which are sent to the processor;
- xi. the processor controlling the at least one transceiver to transmit subsequent multiple acoustic signals in a corresponding subsequent zone even further removed from the at least one ultrasonic transceiver, and to receive multiple corresponding subsequent return signal which are sent to the processor, the processor controlling the at least one transceiver to continue to transmit subsequent acoustic signals in corresponding subsequent zones until acoustic signals have been transmitted in all of the zones;
- xii. the processor transmitting binary and analog data representative of all the processed return signals, as well as analog data representative of the unprocessed return signals to a backend infrastructure for storing or further processing.

18. The method of claim 17, wherein if energy conservation is not required and the broadband terrestrial network access is available, the method further comprising prior to step ix of communicating with the backend infrastructure to determine if there are any updates to the at least one cargo detection algorithm, and to download at least one of the updates.

19. The method of claim 17, wherein if energy conservation is not required, the at least one ultrasonic transceiver transmits the multiple acoustic signals and receives the multiple return signals at multiple gain levels.

* * * * *